No. 627,485.  
W. J. DAWSON.  
POTATO DIGGER.  
(Application filed Jan. 26, 1897.)
Patented June 27, 1899.
(No Model.)
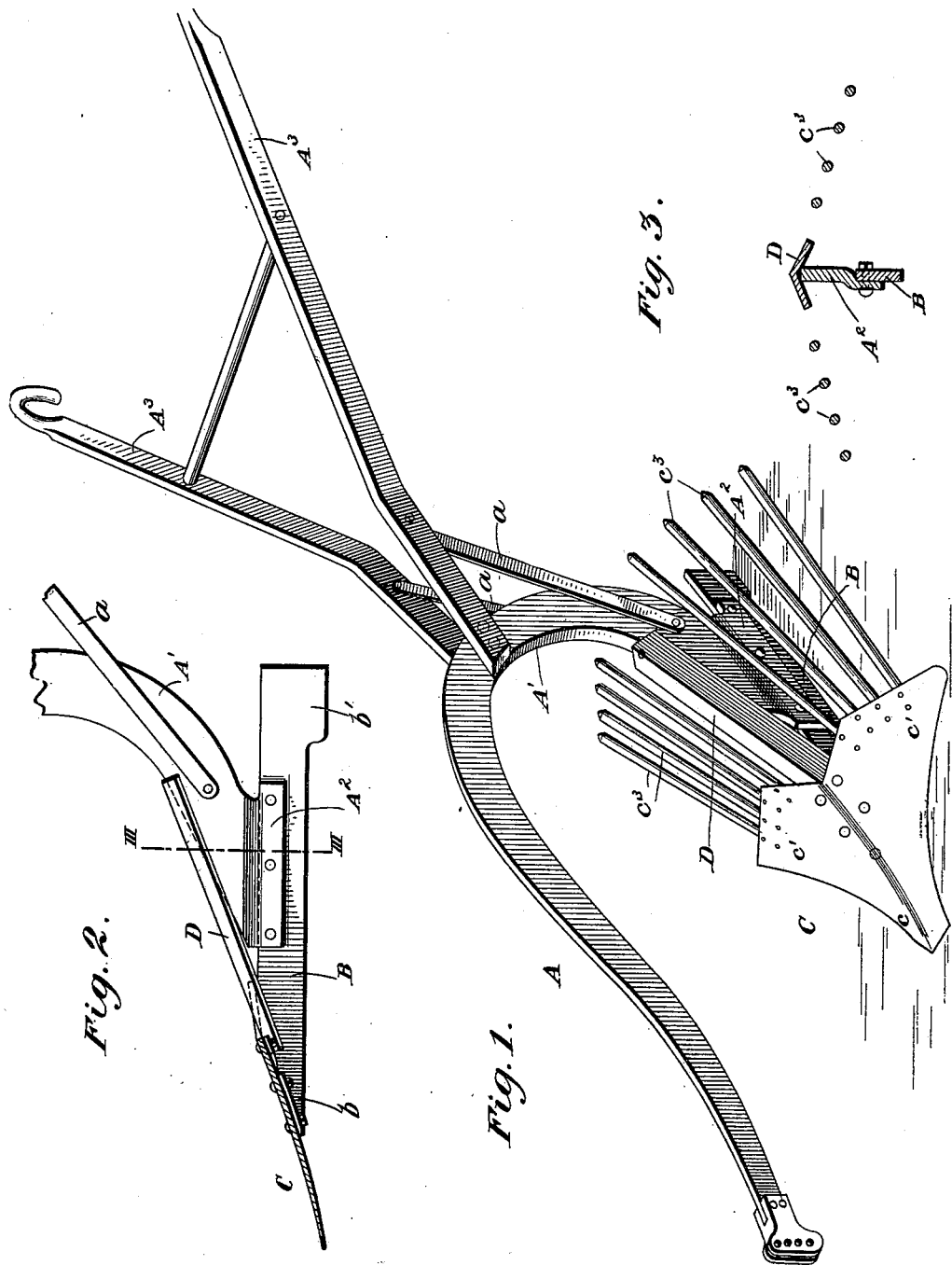
WITNESSES  
INVENTOR

UNITED STATES PATENT OFFICE.

WILLIAM J. DAWSON, OF LINWOOD, KANSAS.

POTATO-DIGGER.

SPECIFICATION forming part of Letters Patent No. 627,485, dated June 27, 1899.

Application filed January 26, 1897. Serial No. 620,728. (No model.)

*To all whom it may concern:*

Be it known that I, WILLIAM J. DAWSON, a citizen of the United States, residing at Linwood, in the county of Leavenworth and State of Kansas, have invented certain new and useful Improvements in Potato-Diggers; and I do hereby declare the following to be a full, clear, and exact description of the invention, such as will enable others skilled in the art to which it appertains to make and use the same.

This invention relates to potato-diggers, but more particularly to that class of potato-diggers in which a share is secured to a plow-standard and provided with rearwardly and upwardly inclined bars or rods adapted to operate as a screen or sieve to sift or separate the earth and potatoes and leave the latter lying upon the surface of the earth exposed to view, so as to adapt them to be readily gathered and housed.

The primary object of my invention is to provide a simple, inexpensive, strong, efficient, and durable potato-digger which will effectually unearth the potatoes, separate them from the soil, and expose them to view for collection without mutilating, cutting, or injuring them or leaving a portion thereof covered and concealed beneath the surface.

The invention will first be hereinafter more particularly described with reference to the accompanying drawings, which form a part of this specification, and then pointed out in the claims at the end of the description.

In the drawings, in which similar letters of reference are used to denote similar parts, Figure 1 is a perspective view of a potato-digger embodying my invention. Fig. 2 is a longitudinal section of the share, showing the separating-bar, the runner, and a broken-away portion of the beam-standard in side elevation; and Fig. 3 is a cross-section taken on the line III III of Fig. 2.

It has heretofore been proposed to construct potato-diggers of the same general type as that herein shown—that is, with a share secured to the foot of a plow beam or standard and a series of rods projecting rearwardly from the share, so as to form a set or series of rods at either side of the beam or standard—and it has been proposed to provide in connection with such an arrangement an upwardly and rearwardly inclined knife or cutter between the two series of rods; but such machines without the knife have been found to be more or less objectionable in practice on account of their liability to clog and the consequent ineffectual separation of the potatoes from the soil, while those using the knife are objectionable because of the large number of potatoes that are cut or injured by the knife. To obviate these objections, I have devised a construction and arrangement of parts substantially as hereinafter described and shown in the drawings, wherein I employ instead of a knife an angular separating-bar, the angle of which is sufficiently sharp or acute to adapt the same to break clods, &c., and sever the potato vines, roots, &c., which impede the progress of the digger, but without cutting or injuring the potatoes, and this bar also facilitates the division of mass of soil, potatoes, &c., moving upwardly onto the inclined fingers, while a complete separation of the potatoes from the soil is accomplished without injury to the potatoes.

A denotes a plow-beam which in the form shown consists of a single piece of metal formed with a standard $A'$ at its rear end, which standard is bent in a gradual curve downwardly and thence forwardly and terminates in a foot $A^2$ for the attachment thereto of a base-piece or runner B, which will be hereinafter more particularly described.

$A^3$ $A^3$ denote a pair of ordinary handles, which have their forward ends secured to the rear curved portion of the beam or standard and may be supported at the desired elevation by means of the braces or bars $a$ $a$, which latter may be made adjustable, if desired, for the purpose of varying the inclination of the handles to meet different requirements in use.

To the foot of the beam A is bolted or otherwise secured a shoe or runner B, which latter preferably consists of a flat metallic bar, of cast metal or steel plate, having flanges on its forward end $b$, shaped on the upper surface thereof to fit underneath and against the correspondingly inclined or curved under side of the share C, to which it is secured by bolts or rivets, and having at its rear end a depressed portion or heel $b'$. This heel is offset or dropped down below the bottom of the main portion of the runner sufficiently to adapt it to ride upon the bottom of the furrow or surface of the soil, while the main portion of the shoe, between said heel and the point or share C, rides above and out of contact with said surface, whereby a light-running movement is secured and the implement is steadied and guided in its movements and sudden sidewise or lateral thrusts or erratic movements are avoided, the heel $b'$ being adapted to take into the earth far enough to prevent such erratic movements, but without causing the main portion of the runner to contact with the surface or bottom of the furrow. The runner B preferably extends some distance in front and also in rear of the foot $A^2$ of the beam A, and to its forward end is secured the share C. In the form shown the share C is provided with a point $c$ and lateral wings $c'$ and is inclined upwardly and rearwardly, while its sides are inclined outwardly and downwardly from its longitudinal center, so as to afford a broad surface, sloping gently upward and rearward in the plane of the rods projecting therefrom, while its sides slope gently downward in opposite directions, which construction facilitates the penetration of the share and the passage of the soil and potatoes up the incline and at the same time gives to the upwardly-moving mass a tendency to divide laterally.

To the rear and under side of each of the wings $c'$ $c'$ are secured rearwardly-projecting rods or fingers $c^3$ $c^3$, which are arranged at suitable distances apart and are inclined gently rearward and upward, preferably at an angle of about thirty degrees, and are made to slightly diverge from each other from their front toward their rear ends, so as to give to the connected share and fingers a fan-shaped form. Arranged midway between the two series of fingers $c^3$ is an angular separating-bar D, the angular or convex portion of which is placed uppermost to adapt said bar to break up and separate the soil and potatoes and to divide the same into two masses, one portion of which is thrown upon the fingers at each side. The front end of said separating-bar preferably underlies the share C and may be secured thereto and to the runner B by bolts extending through the share, separating angle-bar, and runner, thus firmly securing these parts together. From the share C the separating-bar D inclines upwardly and rearwardly at about the same angle as the inner rods or fingers $c^3$, and its sides are gently inclined toward the series of fingers $c^3$ on opposite sides, so as to lie in the same respective planes with the two series of fingers. The upper rear end of this separating-bar may rest upon the front of the standard $A^3$ and be secured thereto by bolts or otherwise.

As thus constructed when the machine is in operation the earth will be loosened and thrown up, with the potatoes, onto the two sets of fingers, while the angle-bar serves to break up and separate the soil, roots, and potatoes and to divide the same into two portions, one of which is turned over to the right and the other to the left upon the fingers, by which the potatoes are effectually separated from the soil and left upon the surface in plain view, the fingers permitting the soil to fall between them, while the potatoes are carried back and delivered over their rear ends.

By attaching the angular separating-bar D to the standard and runner in the manner described a strong and rigid connection is secured, and the bar is made capable of resisting great pressure, while serving to separate the potatoes and earth and to break or sever roots and the like without cutting or injuring the potatoes, the inclined sides of the said bar causing the soil and potatoes to be thrown over upon the two series of divergent bars or fingers, from which the potatoes are delivered at the rear of the fan-shaped structure free from the soil. The runner B causes the digger to run in a straight line and prevents sudden sidewise thrusts or erratic movements thereof.

I am aware that it is not broadly new to construct a potato-digger with a share secured to the front of a plow-beam and a series of rods or fingers secured to the share so as to project rearwardly and upwardly therefrom, and hence I make no broad claim to such constructions.

Having thus fully described my invention, what I claim as new, and desire to secure by Letters Patent of the United States, is—

1. A potato-digger comprising the beam, the share, and a series of rearwardly-projecting upwardly-inclined rods or fingers secured at each side of the longitudinal center of said share so as to form a sieve-like continuation of the surface of the share, together with an upwardly and rearwardly inclined separating-bar of approximately V shape in cross-section arranged intermediate the two series of fingers with the angle thereof toward the front of the machine and its sides in substantially the planes of the said series respectively; said separating-bar being adapted to sever vines, roots, &c., without cutting the potatoes, and to separate and divide the mass of soil, potatoes, &c., so as to cause the same to be thrown over onto the inclined fingers, whereby they may be separated from the soil and left upon the surface in plain view, substantially as described.

2. In a potato-digger the combination with the plow beam and standard, of a runner secured to the foot of the standard and extending in front and rear thereof, a share secured to the front end of the runner and having lateral wings arranged at an angle to each other, rods or fingers secured to said wings in series on opposite sides of the longitudinal center of the share and projecting rearwardly therefrom on a gradual upward inclination, and an intermediate separating-bar secured to the share in the angle thereof and extending rearwardly and upwardly therefrom overlying the standard, said bar composed of angle-iron having the angle toward the front of the machine and having its sides in substantially the planes of the series of rods respectively.

In testimony whereof I affix my signature in presence of two witnesses.

WILLIAM J. DAWSON.

Witnesses:
  W. H. ELDER,
  C. F. TROUT.